United States Patent [19]

Yoshida

[11] Patent Number: 5,532,202
[45] Date of Patent: Jul. 2, 1996

[54] THERMAL TRANSFER SHEET

[75] Inventor: Kazuya Yoshida, Tokyo-to, Japan

[73] Assignee: Dai Nippon Printing Co., Ltd., Japan

[21] Appl. No.: 365,436

[22] Filed: Dec. 28, 1994

[30]     Foreign Application Priority Data

Dec. 28, 1993   [JP]   Japan ..................... 5-349359

[51] Int. Cl.$^6$ .............. B41M 5/035; B41M 5/38
[52] U.S. Cl. ............ 503/227; 428/195; 428/913; 428/914
[58] Field of Search ................. 8/471; 428/195, 428/913, 914; 503/227

[56]         References Cited

U.S. PATENT DOCUMENTS

| | | |
|---|---|---|
| 4,910,187 | 3/1990 | Sato et al. ........................ 503/227 |
| 5,034,371 | 7/1991 | Tanaka et al. ................... 503/227 |

*Primary Examiner*—B. Hamilton Hess
*Attorney, Agent, or Firm*—Parkhurst, Wendel & Burr

[57]           ABSTRACT

A thermal transfer sheet for a thermal transfer system using a sublimable dye is provided which can provide a sharp full-color image having a satisfactory density and, at the same time, excellent various types of fastness, particularly excellent light fastness. The thermal transfer sheet comprises a substrate sheet and a dye layer provided on one surface of the substrate sheet, the dye layer comprising a binder and a dye represented by the following formula A:

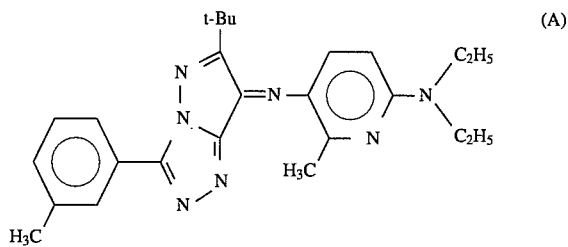

3 Claims, No Drawings

THERMAL TRANSFER SHEET

BACKGROUND OF THE INVENTION

The present invention relates to a thermal transfer sheet. More particularly, the present invention relates to a thermal transfer sheet for a thermal transfer system using a sublimable dye, which thermal transfer sheet can provide a sharp full-color image having a satisfactory density and, at the same time, excellent various types of fastness, particularly excellent light fastness.

Various sublimation thermal transfer methods are known in the art, and an advance in the recording method in recent years has enabled fine letters, figures, full-color photographs, and the like to be formed at a high speed by means of a thermal head or the like on a thermal transfer image-receiving sheet comprising a dye-receptive layer formed on a polyester sheet or paper.

In the prior art, the heating time for the thermal transfer by means of a thermal head should be very short. In this case, a sublimable dye and a material, on which an image is to be transferred, are not sufficiently heated, making it impossible to form an image having a satisfactory density. In order to cope with recording at a high speed, a dye having excellent sublimability has been developed. Since, however, this dye generally has a low molecular weight, the dye after transfer to the material, on which an image is to be transferred, lacks in light resistance, causing a problem that the color of the image fades with time.

When a dye having a relatively large molecular weight is used in order to avoid the above problem, the sublimation rate of the dye in the course of recording at a high speed is so low that no image having a satisfactory density can be provided.

The reproduction of a full-color image in the thermal transfer method using a thermal head relies upon subtraction color mixing. In this case, a combination of three primary colors of yellow, magenta, and cyan is very important for reproducing a satisfactory full-color image. In the case of conventional thermal transfer sheets using three color dyes, the dyes are satisfactory in one or two of color density, sharpness, and various types of fastness, particularly light fastness. However, a combination of three color dyes satisfying all the above requirements is not known in the art.

Accordingly, an object of the present invention is to provide a thermal transfer sheet for a thermal transfer system using a sublimable dye, which thermal transfer sheet can form a sharp full-color image having a satisfactory density and, at the same time, excellent various types of fastness, particularly excellent light fastness.

DISCLOSURE OF THE INVENTION

The above object can be attained by the following present invention. Specifically, the present invention provides a thermal transfer sheet comprising a substrate sheet and a dye layer provided on one surface of said substrate sheet, said dye layer comprising a binder and a dye represented by the following formula A:

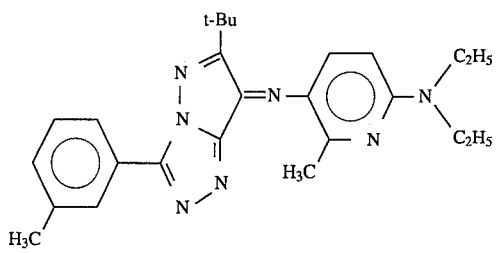

The dye represented by the following formula A, as compared with other dyes, can form an image having higher density and sharpness and, further, superior various types of fastness, particularly light fastness. The use of the dye represented by the formula A in combination with other particular dyes can provide a full-color image having high density and sharpness and, further, excellent various types of fastness, particularly light fastness.

BEST MODE FOR CARRYING OUT THE INVENTION

The present invention will now be described in more detail with reference to the following preferred embodiments.

The dye represented by the formula A used in the present invention can be synthesized by the conventional method. In the present invention, the dye represented by the formula A may be used alone. Alternatively, it may be used in the form of a mixture thereof with dyes represented by the following formulae 2 to 16 for the purpose of regulating the color tone. When a dye mixture is used, it is also possible to use a dye represented by the following formula 1 instead of the dye represented by the formula A. When the dye mixture is used, at least one of the dyes represented by the formulae 2 to 16 is preferably used in an amount of 25 to 400 parts by weight based on 100 parts by weight of the dye represented by the formula A or the formula 1.

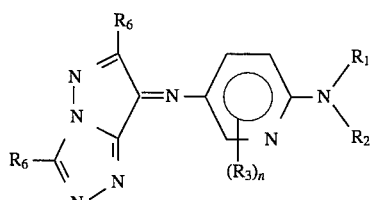

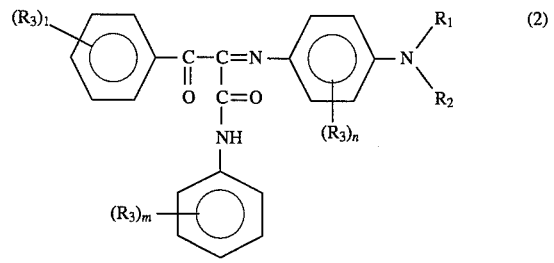

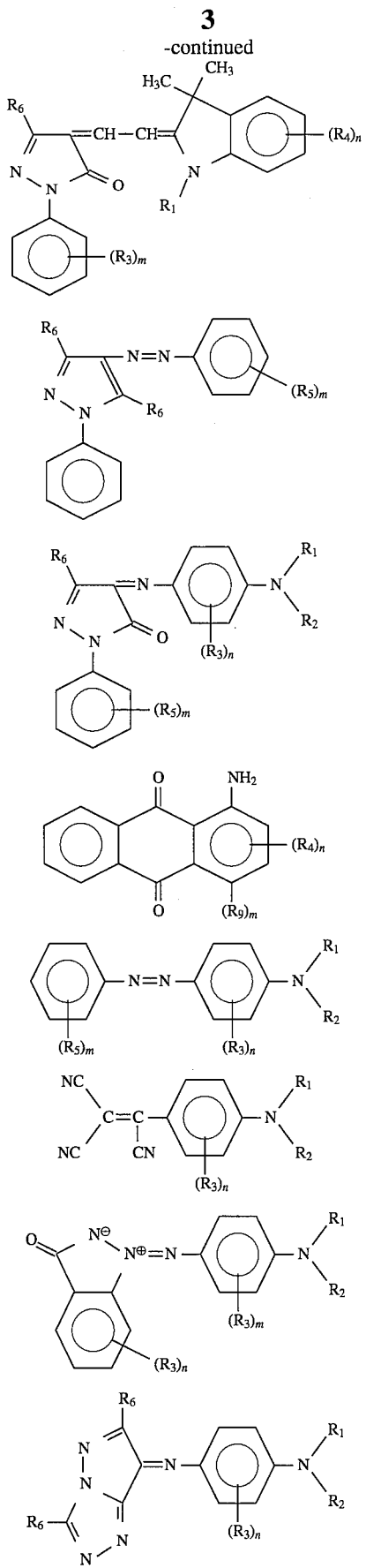
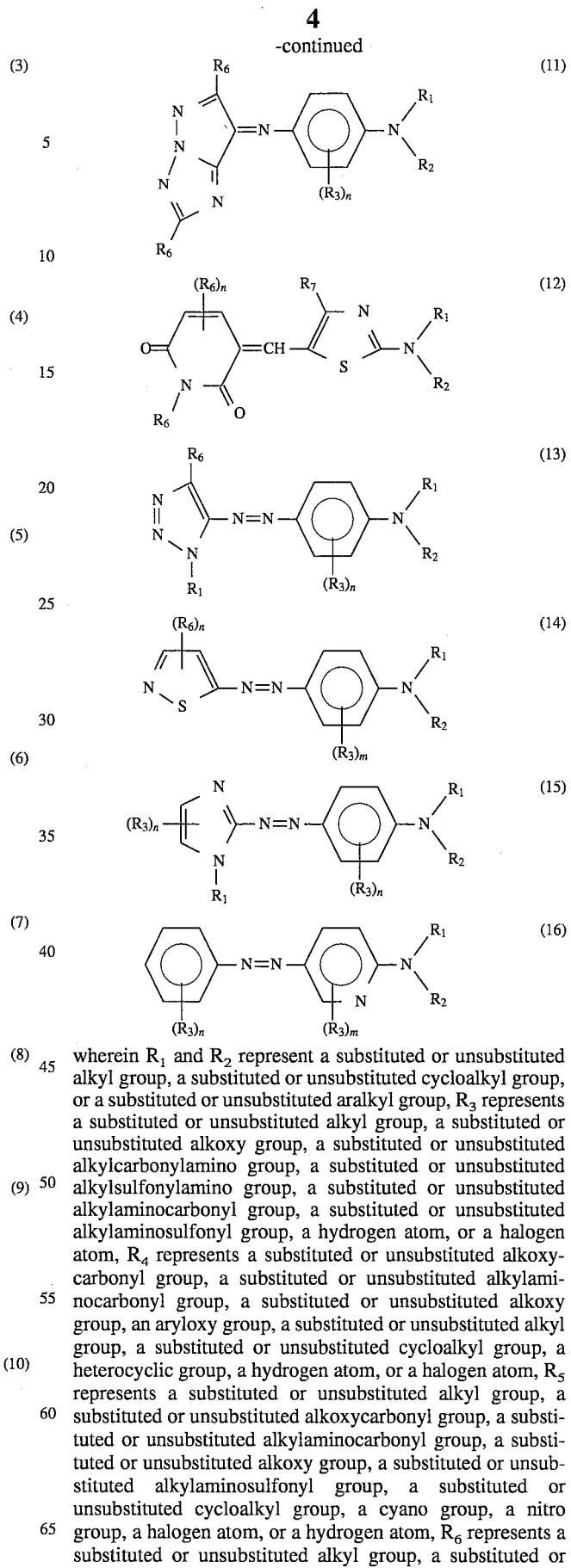

wherein $R_1$ and $R_2$ represent a substituted or unsubstituted alkyl group, a substituted or unsubstituted cycloalkyl group, or a substituted or unsubstituted aralkyl group, $R_3$ represents a substituted or unsubstituted alkyl group, a substituted or unsubstituted alkoxy group, a substituted or unsubstituted alkylcarbonylamino group, a substituted or unsubstituted alkylsulfonylamino group, a substituted or unsubstituted alkylaminocarbonyl group, a substituted or unsubstituted alkylaminosulfonyl group, a hydrogen atom, or a halogen atom, $R_4$ represents a substituted or unsubstituted alkoxycarbonyl group, a substituted or unsubstituted alkylaminocarbonyl group, a substituted or unsubstituted alkoxy group, an aryloxy group, a substituted or unsubstituted alkyl group, a substituted or unsubstituted cycloalkyl group, a heterocyclic group, a hydrogen atom, or a halogen atom, $R_5$ represents a substituted or unsubstituted alkyl group, a substituted or unsubstituted alkoxycarbonyl group, a substituted or unsubstituted alkylaminocarbonyl group, a substituted or unsubstituted alkoxy group, a substituted or unsubstituted alkylaminosulfonyl group, a substituted or unsubstituted cycloalkyl group, a cyano group, a nitro group, a halogen atom, or a hydrogen atom, $R_6$ represents a substituted or unsubstituted alkyl group, a substituted or unsubstituted aryl group, a substituted or unsubstituted amino group, a substituted or unsubstituted cycloalkyl group, a cyano group, a nitro group, or a halogen atom, $R_7$ represents a substituted or unsubstituted aryl group, an aromatic heterocyclic group, a cyano group, a nitro group, a halogen atom, or other electron-withdrawing groups, $R_8$ represents a substituted or unsubstituted alkyl group, a cycloalkyl group, or an $NR_{10}R_{11}$ group (wherein $R_{10}$ and $R_{11}$ represent a substituted or unsubstituted alkylcarbonyl group or a substituted or unsubstituted arylcarbonyl group), $R_9$ represents an amino group or a hydroxyl group, and l, m, and n are an integer of 1 to 4.

According to another preferred embodiment of the present invention, there is provided a thermal transfer sheet comprising a substrate sheet and, successively formed on the same plane of one surface of the substrate sheet, dye layers of at least three colors of yellow, magenta, and cyan.

In this case, the dye layer of yellow comprises a binder and a dye represented by the following formula 17, the dye layer of magenta comprises a dye represented by the formula A or the formula 1, and the dye layer of cyan comprises a dye represented by the following formula 18. These dyes each may be used alone or in the form of a mixture. Further, the dyes each may be used in combination with dyes, other than those represented by the above general formulae, having the same hue.

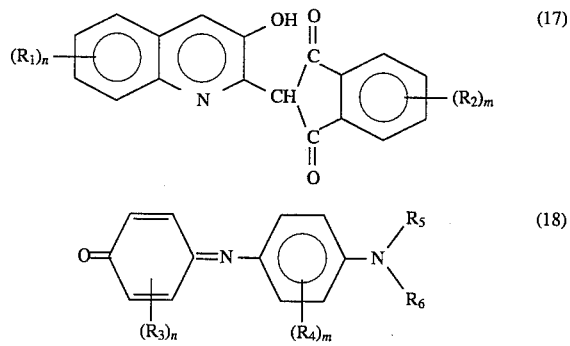

wherein $R_1$ represents a substituted or unsubstituted alkyl or alkoxy group, $R_2$ represents an alkoxycarbonyl group, an alkylaminocarbonyl group, an alkoxyalkyl group, an alkyl group, or a cycloalkyl group, $R_3$ represents an alkyl group, a hydrogen or halogen atom, CONHR, NHCOR, $NHSO_2R$, or $SO_2NHR$ (wherein R represents a substituted or unsubstituted alkyl group, a cycloalkyl group, an aryl group, or a aromatic heterocyclic group), $R_4$ represents a substituted or unsubstituted alkyl group, an alkoxy group, an alkylcarbonylamino group, an alkylsulfonylamino group, a carbamoyl group, a sulfamoyl group, a hydrogen atom, or a halogen atom, $R_5$ and $R_6$ represent a substituted or unsubstituted alkyl group or an aryl group, and m and n are an integer of 1 to 4.

The thermal transfer sheet of the present invention is characterized by using dyes represented by the formulae A and 1 to 18, and other constituent features than described above may be the same as those of the conventional thermal transfer sheet. Further, in the present invention, in order to regulate the hue, it is possible to mix conventional yellow, magenta, and cyan dyes other than the above dyes with the above particular dyes. Representative examples thereof generally include diarylmethane dyes, triarylmethane dyes, thiazole dyes, methine dyes, such as merocyanine, azomethine dyes exemplified by indoaniline, acetophenoneazomethine, pyrazoloazomethine, imidazoleazomethine, imidazoazomethine, and pyridoneazomethine, xanthine dyes, oxazine dyes, cyanomethylene dyes exemplified by dicyanostyrene and tricyanostyrene, thiazine dyes, azine dyes, acridine dyes, benzene azo dyes, heterocyclic azo dyes exemplified by pyridone azo, thiophene azo, isothiazole azo, pyrrole azo, pyrazole azo, imidazole azo, thiadiazole azo, triazole azo, and disazo, spirodipyran dyes, indolinospiropyran dyes, fluoran dyes, rhodamine lactam dyes, naphthoquinone dyes, anthraquinone dyes, and quinophthalone dyes.

The substrate sheet used in the thermal transfer sheet of the present invention may be any conventional sheet so far as it has a certain degree of heat resistance and strength. Examples thereof include paper, various types of converted paper, a polyester film, a polystyrene film, a polypropylene film, a polysulfone film, a polycarbonate film, an aramid film, a polyvinyl alcohol film, and cellophane, the above sheets having a thickness in the range of from about 0.5 to 50 μm, preferably in the range of from about 3 to 10 μm. Among them, a polyester film is particularly preferred.

The above dye layers are supported on a substrate sheet by taking advantage of any binder resin.

The binder resin used for supporting the dye layers on the substrate sheet may be any known binder, and preferred examples thereof include cellulosic resins, such as ethyl cellulose, hydroxyethyl cellulose, ethyl hydroxy cellulose, hydroxypropyl cellulose, ethyl hydroxyethyl cellulose, methyl cellulose, cellulose acetate, cellulose acetate butylate, cellulose acetate propionate, and cellulose nitrate, vinyl resins, such as polyvinyl alcohol, polyvinyl acetate, polyvinyl butyral, polyvinyl acetoacetal, polyvinyl pyrrolidone, polystyrene, and polyvinyl chloride, acrylic resins, such as polyacrylonitrile and polyacrylic esters, polyamide resins, polyester resins, polycarbonate resins, phenoxy resins, phenolic resins, epoxy resins, elastomer, and the like. They may be used alone or in the form of a mixture or a copolymer thereof. Further, they may contain various curing agents. Among the above binder resins, polyvinyl butyral and polyvinyl acetoacetal are preferred from the viewpoint of the heat resistance, migration of dyes, and the like.

Further, in the present invention, the following releasable graft copolymers may be used as a release agent or a binder instead of the above binder. The releasable graft copolymer is prepared by grafting, on a main chain of a polymer, at least one releasable segment selected from a polysiloxane segment, a carbon fluoride segment, a fluorinated hydrocarbon segment, and a long chain alkyl segment.

Among the above type of releasable graft copolymers, particularly preferred is a graft copolymer prepared by grafting a polysiloxane segment onto a main chain of a polyvinyl acetal resin.

The above graft copolymer can be produced, for example, by reacting a polysiloxane having a functional group with a diisocyanate to prepare a grafting silicone chain and grafting the grafting silicone chain onto polyvinyl acetal. More specifically, for example, hexamethylene diisocyanate is reacted with a dimethylpolysiloxane having a hydroxyl group in its one terminal in a solvent of a 1:1 mixture of methyl ethyl ketone and methyl isobutyl ketone in the presence of about 0.01–1.0% by weight of a tin catalyst (for example, dibutyltin) at a temperature of about 50° to 100° C. to produce a grafting silicone chain. Then, the grafting silicone chain is reacted with a polyvinyl acetal resin in a solvent of a 1:1 mixture of methyl ethyl ketone and methyl isobutyl ketone to produce a silicone-grafted polyvinyl acetal resin.

When the above graft copolymer is used as a releasing agent for the dye layer, the content of the releasable segment in the release agent is preferably 10 to 80% by weight. When the content of the releasable segment is excessively low, the releasability is unsatisfactory. On the other hand, when it is excessively high, the compatibility with the binder is lowered, causing a problem associated with migration of dyes and the like. When the release agent is added to the dye layer, a single kind of a release agent may be used or alternatively a mixture of a plurality of different release agents may be used. The amount of the release agent added is preferably in the range of from 1 to 40 parts by weight based on 100 parts by weight of the binder resin.

When the amount of the release agent added is excessively small, the releasing effect is unsatisfactory. On the other hand, when it is excessively large, the migration of dyes or strength of the dye layers is lowered and, at the same time, there occur problems of discoloration of dyes in the dye layers and storage stability of the thermal transfer sheet.

On the other hand, when the above graft copolymer is used as a binder for the dye layer, the content of the releasable segment in the binder resin is preferably in the range of from 0.5 to 40% by weight. When the content of the releasable segment is excessively low, the releasability of the dye layer is unsatisfactory. On the other hand, when it is excessively high, the migration of dyes or strength of the dye layers is lowered and, at the same time, there occur problems of discoloration of dyes in the dye layers and storage stability of the thermal transfer sheet.

The dye layer of the thermal transfer sheet according to the present invention basically comprises the above materials and, if necessary, further contains conventional various additives.

The above dye layer is formed as follows. Preferably, dye and a binder resin as described above, and optional ingredients, for example, organic fine particles of polyethylene wax or the like or inorganic fine particles for improving the releasability and the coatability of the ink are dissolved or dispersed in a suitable solvent to prepare a coating solution or an ink for the formation of a dye layer. The coating solution or ink for a dye layer thus prepared is coated on the above substrate sheet, and the resultant coating is then dried to form a dye layer.

The thickness of the dye layer formed in this way is in the range of from about 0.2 to 5.0 μm, preferably in the range of from about 0.4 to 2.0 μm. The content of the dye in the dye layer is preferably in the range of from 5 to 70% by weight, preferably in the range of from 10 to 60% by weight.

When dye layers of at least three layers of yellow, magenta, and cyan are provided on the same plane of one surface of the substrate sheet, they may be successively formed using dyes having respective hues in suitable widths on the surface of the substrate sheet in the same manner as described above.

The above thermal transfer sheet of the present invention, as such, is sufficiently useful for thermal transfer purposes. However, an anti-tack layer, that is, a release layer, may be further provided on the surface of the dye layer. The provision of such a layer can prevent the adhesion between the thermal transfer sheet and a thermal transfer image-receiving sheet at the time of thermal transfer, enabling a higher thermal transfer temperature to be used to form an image having a higher density.

For the release layer, mere deposition of an inorganic powder having an anti-tack property has a considerable effect. Further, a resin having excellent releasability, for example, a silicone polymer, an acrylic polymer, or a fluorinated polymer, may be used to form a release layer having a thickness in the range of from 0.01 to 5 μm, preferably in the range of from 0.05 to 2 μm.

In this connection, it is noted that the above inorganic powder or releasable polymer exhibits a satisfactory effect also when incorporated in the dye layer. Furthermore, a heat resistant layer may be, if necessary, provided on the back surface of the above thermal transfer sheet through a primer layer for the purpose of preventing an adverse effect of heat derived from a thermal head.

In the present invention, the dye layers of three or four colors are successively provided on the same plane of a substrate film, and a transferable dye-receptive layer and/or a transferable transparent protective layer may be further provided thereon. The provision of the transferable receptive layer enables a color image to be formed on any material, on which an image is to be transferred, such as paper, even when the material, on which an image is to be transferred, is not dyable with a dye, by first providing a transferable receptive layer on the above material and then allowing dyes to thermally migrate from the dye layers to the receptive layer.

The provision of the transferable transparent protective layer on the same plane of the substrate film enables various types of durability to be markedly improved by transferring the transferable transparent protective layer on the surface of a color image.

The above transferable receptive layer and transferable transparent protective layer are described in detail in an earlier patent application such as Japanese Patent Application No. 44734/1994 or Japanese Patent Laid-Open Publication No. 8558/1993 filed by the same applicant as the present application.

A thermal image-receiving sheet on which an image is to be transferred using the above thermal transfer sheet may be any material so far as the recording surface of the material is receptive to the above dye. When a material having no receptivity to the dye, such as paper, a metal, glass, or a synthetic resin, is used for this purpose, a dye-receptive layer may be formed on at least one surface thereof.

Examples of the thermal transfer image-receiving sheet having no need of forming any dye-receptive layer thereon include fibers, woven fabrics, films, sheets, molded products, and the like of polyolefin resins, such as polypropylene, halogenated polymers, such as polyvinyl chloride and polyvinylidene chloride, vinyl polymers, such as polyvinyl acetate and polyacrylic esters, polyester resins, such as polyethylene terephthalate and polybutylene terephthalate, polystyrene resins, polyamide resins, resins of copolymers of olefin, such as ethylene and propylene, with other vinyl monomers, ionomers, cellulosic resins, such as cellulose diacetate, polycarbonates, and the like.

A thermal transfer image-receiving sheet used in combination with the thermal transfer sheet of the present invention is particularly preferably a sheet or a film of a polyester or a sheet provided with a polyester layer. A thermal transfer image-receiving sheet of a vinyl chloride/vinyl acetate copolymer is also preferred. Even in the case of paper, metals, glass, and other undyable thermal transfer image-receiving sheets, coating of a solution or a dispersion of the above dyable resin on a recording surface thereof followed by drying, or alternatively lamination of a film of the dyable resin on a recording surface thereof, enables the resultant product to be used as a thermal transfer image-receiving sheet.

Further, even in the case of the above dyable thermal transfer image-receiving sheet, a resin having a better dyability may be formed on the surface thereof in the same manner as described above in connection with paper, thereby forming a dye-receptive layer. The dye-receptive layer formed in the above manner may, of course, comprise a single material or a plurality of materials and contain various additives in such an amount as will not be detrimental to the contemplated object.

Although the thickness of the above dye-receptive layer may be any desired one, it is generally in the range of from 3 to 50 μm. Further, the dye-receptive layer is preferably in the form of a continuous coating. Alternatively, it may be in the form of a discontinuous coating formed by using a resin emulsion or a resin dispersion.

The thermal transfer-image receiving sheet is basically as described above and, as such, may be used with satisfactory results. However, the above thermal transfer image-receiving sheet or the dye-receptive layer may contain an anti-tack inorganic powder. The incorporation of the anti-tack inorganic powder serves to prevent the adhesion between the thermal transfer sheet and the thermal transfer image-receiving sheet even when the thermal transfer temperature is raised, thus enabling thermal transfer to be carried out with better results. Finely divided silica is particularly preferred.

The above resin having a good releasability may be added instead of or in combination with the above inorganic powder, such as silica. Particularly preferred releasable polymers include cured products of silicone compounds, for example, a cured product comprising an epoxy-modified silicone oil and an amino-modified silicone oil. A hydroxy-modified silicone and an addition-polymerizable silicone are used alone or in combination. The above release agent preferably occupies about 0.5 to 30% by weight of the dye-receptive layer.

Further, the above inorganic powder may be deposited on the surface of the dye-receptive layer of the thermal transfer image-receiving sheet for the purpose of enhancing the anti-tack effect. Alternatively, it is also possible to provide a layer of a release agent having a good releasability.

The above release layer can exhibit satisfactory effect in a thickness in the range of from about 0.01 to 5 μm and further improve receptivity to dye while preventing the adhesion between the thermal transfer sheet and the dye-receptive layer.

An embodiment wherein a card is used as a material, on which an image is to be transferred, will now be described. A card substrate used in the card according to the present invention is not particularly limited so far as it has on its surface a dye-receptive layer dyable with a sublimable dye. Examples thereof include a film, a sheet, or other forms of conventional various plastics, such as polyolefins, polyvinyl chloride, polyethylene terephthalate, polystyrene, polymethacrylate, and polycarbonate; a white opaque film or foamed sheet prepared by adding a white pigment or a filler to the above synthetic resin and preparing a film or a foamed sheet therefrom; and synthetic paper (polyolefin, polystyrene, or other synthetic paper), wood free paper, art paper, coated paper, cast coated paper, wall paper, backing paper, paper impregnated with a synthetic resin or emulsion, paper impregnated with a synthetic rubber latex, paper with a synthetic resin being internally added thereto, paperboard, cellulose fiber paper, and the like.

Furthermore, it is also possible to use a laminate comprising any combination of the above substrate films.

A preferred embodiment of the card substrate used in the present invention comprises a center core of polyvinyl chloride containing a white pigment and, laminated on both surfaces thereof, a transparent polyvinyl chloride layer. The transparent vinyl chloride layer, which serves at least as an image forming surface, contains a suitable amount of a plasticizer to improve the dyability thereof with a dye.

The amount of the plasticizer based on 100 parts by weight of polyvinyl chloride constituting the image-receptive surface is preferably in the range of from 0.1 to 10 parts by weight, particularly preferably in the range of from 3 to 5 parts by weight. When the amount of the plasticizer used is excessively small, the dyability with a sublimable dye is unsatisfactory, resulting in such an abnormal transfer phenomenon that the dye layer of the thermal transfer sheet, as such, is transferred at the time of thermal transfer. On the other hand, when it is excessively large, the rigidity of the dye-receptive surface becomes unsatisfactory and soft and, at the same time, bleeding occurs in the printed image during storage of the print, so that no sharp image can be provided.

If necessary, the above dye-receptive surface may further comprise coloring pigments, white pigments, extender pigments, fillers, ultraviolet absorbers, antistatic agents, heat stabilizers, antioxidants, fluorescent brightening agents, and the like.

A necessary magnetic recording layer, embossed pattern, printed pattern, optical memory, IC memory, or bar cord, or the like may be previously formed on the surface of the above card substrate. Alternatively, the above magnetic recording layer or the like may be provided after information, such as a face shot, is provided thereon by a sublimation transfer system.

The face shot provided on the card substrate can be formed by a conventional method using the sublimation thermal transfer sheet of the present invention. Further, information, such as letters, may also be formed using the sublimation thermal transfer sheet. However, the information in the form of a letter is preferably formed by using a hot-melt ink thermal transfer sheet which can provide a high-density black print. It is a matter of course that the above face shot and information in the form of a letter may be formed by using separate thermal transfer sheets. From the viewpoint of process, however, it is advantageous for the face shot and the information in the form of a letter to be simultaneously formed using a composite thermal transfer sheet having both a sublimable dye layer and a hot-melt ink layer.

In order to improve the durability of the above recorded information, such as face shot, a protective layer may be laminated by coating of a transparent coating followed by drying, lamination of a transparent film, or use of a thermal transfer sheet having a protective layer or the above thermal transfer sheet with a protective layer and a dye layer being integrally formed thereon. The protective layer may be provided onto the whole surface of the recorded information or alternatively provided on part of the recorded information. Further, the protective layer may be provided separately from recording of the information. However, according to a preferred embodiment of the present invention, a composite thermal transfer sheet comprising a substrate film and, successively provided on the same plane thereof, at least one sublimable dye layer of at least one color, at least one hot-melt ink layer of at least one color, and a protective layer may be used to enable a gradation image, such as a face shot or a landscape, a monotone image, such as a letter or a symbol, and a transparent protective layer to be simultaneously formed using an identical thermal transfer sheet.

When thermal transfer is carried out using the above thermal transfer sheet of the present invention and the above recording material, thermal energy may be applied by any conventional means. For example, a contemplated object can be sufficiently attained by applying a thermal energy of about 5 to 100 mJ/mm$^2$ through the control of a recording time by means of a recording device, such as a thermal printer (for example, a video printer VY-100 manufactured by Hitachi, Limited).

The present invention will now be described in more detail with reference to the following Examples and Comparative Examples. In the Examples and Comparative Examples, "parts" or "%" is by weight unless otherwise specified.

EXAMPLES 1 TO 22

Ink compositions for the formation of a dye layer were prepared according to the following formulations. Each composition was coated on a 6 μm-thick polyethylene terephthalate film, which had been treated for rendering the back surface heat-resistant, at a coverage of 1.0 g/m² on a dry basis to form a coating which was then dried. Thus, thermal transfer sheets according to the present invention were prepared.

| | |
|---|---|
| Dye specified in the following TABLE 1 | 1.5 parts |
| Dye specified in the following TABLE 2 | 1.5 parts |
| Polyvinyl butyral resin | 3.5 parts |
| Methyl ethyl ketone | 46.5 parts |
| Toluene | 46.5 parts |

TABLE 1

Dye of formula (1)

| No. | $R_1$ | $R_2$ | $R_3$ | $R_6$ | $R_6$ |
|---|---|---|---|---|---|
| 1-1 | $C_2H_5$ | $C_2H_5$ | $CH_3$ | t-Bu | $C_2F_5$ |
| 1-2 | $C_2H_5$ | $C_2H_5$ | $CH_3$ | t-Bu | 3-Metylphenyl |
| 1-3 | $C_2H_5$ | $C_2H_5$ | $CH_3$ | t-Bu | $-SCH_3$ |

TABLE 2

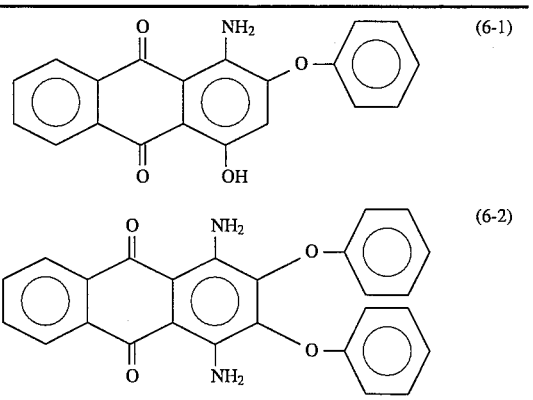

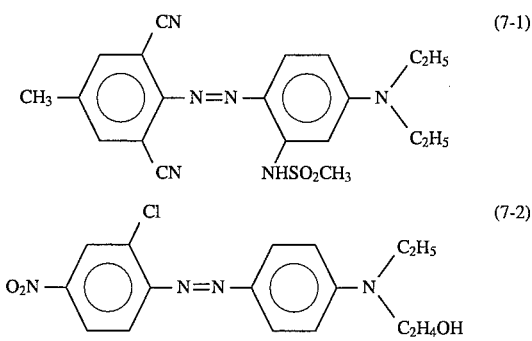

TABLE 2-continued

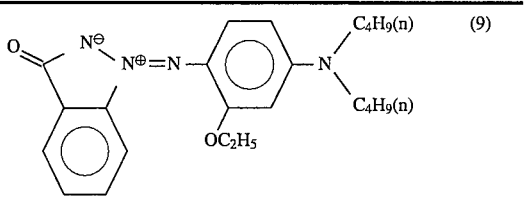

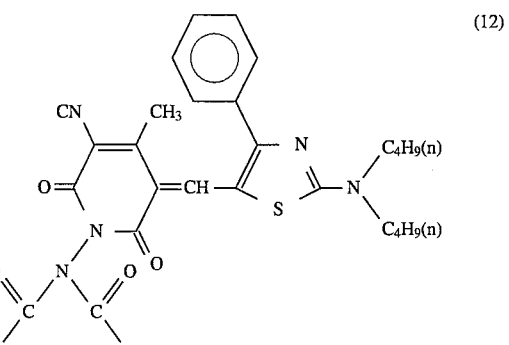

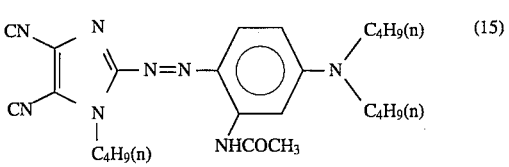

Then, synthetic paper (Yupo-FPG#150; manufactured by Oji-Yuka Synthetic Paper Co., Ltd.) was used as a substrate sheet, and a coating solution having the following composition was coated on one surface of the synthetic paper so that the coverage on a dry basis was 10.0 g/m², and the resultant coating was dried at 100° C. for 30 min to form a thermal transfer image-receiving sheet.

| | |
|---|---|
| Polyester resin (Vylon 200 manufactured by Toyobo Co., Ltd.) | 11.5 parts |
| Vinyl chloride/vinyl acetate copolymer (VYHH: manufactured by UCC) | 5.0 parts |
| Amino-modified silicone (KF-393: manufactured by The Shin-Etsu Chemical Co., Ltd.) | 1.2 parts |
| Epoxy-modified silicone (X-22-343: manufactured by The Shin-Etsu Chemical Co., Ltd.) | 1.2 parts |
| Methyl ethyl ketone | 46 parts |
| Toluene | 46 parts |

COMPARATIVE EXAMPLES 1 TO 7

The procedure of Example 1 was repeated to prepare thermal transfer sheets of Comparative Examples according to the present invention, except that ink compositions for the formation of a dye layer having the following compositions were used instead of the ink composition for the formation of a dye layer of Example 1.

| | |
|---|---|
| Dyes specified in TABLE 2 | 3 parts |
| Polyvinyl butyral resin | 3.5 parts |
| Methyl ethyl ketone | 46.75 parts |
| Toluene | 46.75 parts |

Each of the above thermal transfer sheets of the present invention or the comparative thermal transfer sheets and the above image-receiving sheet were put on top of the other in such a manner that the dye layer and the dye-receiving surface faced each other. Recording was effected by means of a thermal head from the back surface of the thermal transfer sheet under conditions of a head applied voltage of 15.1 V and a printing time of 8 msec per line. The results were as given in the following Table 3 and 4.

Evaluation Method for Color Density

Color density was measured by a densitometer (RD- 918) manufactured by Mcbeth U.S.A.

Evaluation Method for Light Fastness

Light fastness was evaluated using a xenon fadeometer (C135A manufactured by Atlas) under conditions of a black panel temperature of 50° C., 50 kLux, and 50 hr.
- ⊚: Neither color change nor fading in 50 hr test period
- ○: Substantially neither color change nor fading in 50 hr test period
- Δ: Color change or fading in 50 hr test period
- ×: Significant color change or fading in 50 hr test period.

TABLE 3

| | Dye in TABLE 1 | Dye in TABLE 2 | Color density O. D. max | Light fastness |
|---|---|---|---|---|
| Ex.1 | 1—1 | — | 3.06* | ⊚ |
| Ex.2 | 1—2 | — | 3.04 | ⊚ |
| Ex.3 | 1—3 | — | 2.96 | ○ |
| Ex.4 | 1—1 | 6—1 | 2.39 | ⊚ |
| Ex.5 | 1—1 | 6—2 | 2.35 | ⊚ |
| Ex.6 | 1—1 | 7—1 | 2.86 | ○ |
| Ex.7 | 1—1 | 9 | 3.26 | ○ |
| Ex.8 | 1—1 | 12 | 2.69 | ○ |
| Ex.9 | 1—2 | 1—3 | 2.99 | ○ |
| Ex.10 | 1—2 | 6—1 | 2.53 | ⊚ |
| Ex.11 | 1—2 | 6—2 | 2.44 | ⊚ |
| Ex.12 | 1—2 | 7—1 | 2.88 | ○ |
| Ex.13 | 1—2 | 7—2 | 2.92 | ○ |
| Ex.14 | 1—2 | 9 | 3.28 | ○ |
| Ex.15 | 1—2 | 12 | 2.27 | ○ |
| Ex.16 | 1—2 | 15 | 2.88 | ○ |
| Ex.17 | 1—3 | 6—1 | 2.63 | ⊚ |
| Ex.18 | 1—3 | 6—2 | 2.52 | ⊚ |
| Ex.19 | 1—3 | 7—1 | 3.06 | ○ |
| Ex.20 | 1—3 | 7—2 | 3.18 | ○ |
| Ex.21 | 1—3 | 9 | 3.23 | ○ |
| Ex.22 | 1—3 | 12 | 2.96 | ○ |

Note)
(1) For Examples 1 to 3, a single dye as indicated was used in an amount of three parts.
(2) *For the dye of Example 1, the thermal migration was so high that the heat resistance was poor, resulting in bleeding.

TABLE 4

| | Dye in TABLE 1 | Dye in TABLE 2 | Color density O. D. max | Light fastness |
|---|---|---|---|---|
| Comp.Ex. 1 | — | 6—1 | 1.73 | ○ |
| Comp.Ex. 2 | — | 6—2 | 1.74 | ○ |
| Comp.Ex. 3 | — | 7—1 | 2.18 | ○ |
| Comp.Ex. 4 | — | 7—2 | 2.22 | X |
| Comp.Ex. 5 | — | 9 | 2.58 | X |
| Comp.Ex. 6 | — | 12 | 1.57 | ○ |
| Comp.Ex. 7 | — | 15 | 2.18 | ○ |

EXAMPLE 23 AND COMPARATIVE EXAMPLE 8

A thermal transfer sheet of the present invention and a comparative thermal transfer sheet were prepared in the same manner as in Example 1, except that the following ink compositions for the formation of dye layers of three color were prepared and then separately coated each in a width of 30 cm on the surface of the substrate film to form dye layers of three colors, i.e., yellow, magenta, and cyan. The thermal transfer sheets thus formed were evaluated in the same manner as in Example 1. The results are given in Table 6.

| Examples | |
|---|---|
| Yellow ink composition | |
| Yellow dye A listed in TABLE 5 below | 1.8 parts |
| Yellow dye B listed in TABLE 5 below | 1.2 parts |
| Polyvinyl butyral resin | 3.5 parts |
| Methyl ethyl ketone | 46.5 parts |
| Toluene | 46.5 parts |
| Magenta ink composition | |
| Magenta dye A listed in TABLE 5 below | 2.1 parts |
| Magenta dye B listed in TABLE 5 below | 1.05 parts |
| Magenta dye C listed in TABLE 5 below | 0.35 parts |
| Polyvinyl butyral resin | 3.5 parts |
| Methyl ethyl ketone | 46.5 parts |
| Toluene | 46.5 parts |
| Cyan ink composition | |
| Cyan dye A listed in TABLE 5 below | 1.2 parts |
| Cyan dye B listed in TABLE 5 below | 1.2 parts |
| Cyan dye C listed in TABLE 5 below | 0.6 parts |
| Polyvinyl butyral resin | 3.5 parts |
| Methyl ethyl ketone | 46.5 parts |
| Toluene | 46.5 parts |
| Comparative Examples | |
| Yellow ink composition | |
| Yellow dye C listed in TABLE 5 below | 3.0 parts |
| Polyvinyl butyral resin | 3.5 parts |
| Methyl ethyl ketone | 46.5 parts |
| Toluene | 46.5 parts |
| Magenta ink composition | |
| Magenta dye B listed in TABLE 5 below | 2.14 parts |
| Magenta dye D listed in TABLE 5 below | 0.86 parts |
| Polyvinyl butyral resin | 3.5 parts |
| Methyl ethyl ketone | 46.5 parts |
| Toluene | 46.5 parts |
| Cyan ink composition | |
| Cyan dye C listed in TABLE 5 below | 2.25 parts |
| Cyan dye D listed in TABLE 5 below | 0.75 parts |
| Polyvinyl butyral resin | 3.5 parts |
| Methyl ethyl ketone | 46.5 parts |
| Toluene | 46.5 parts |

TABLE 5
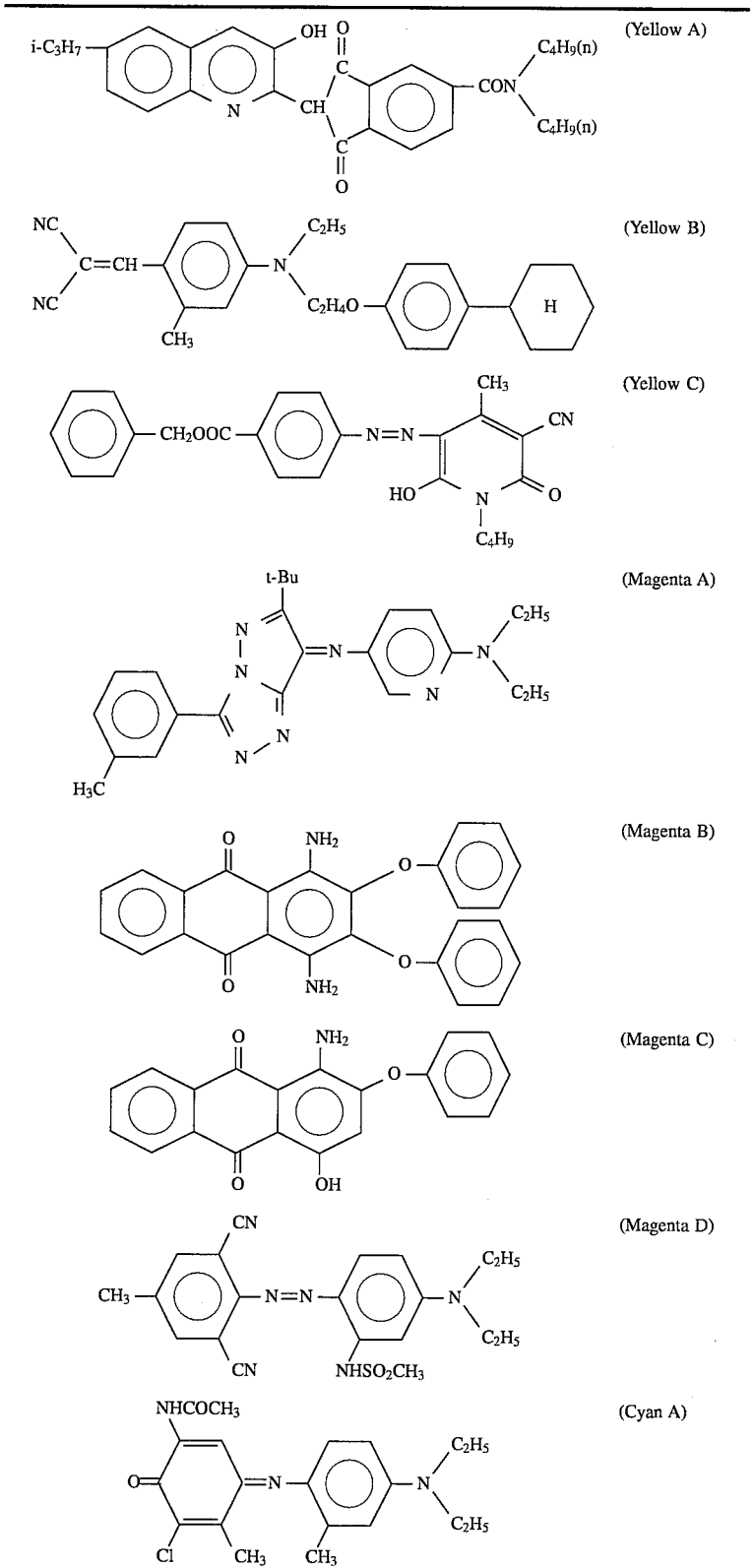

TABLE 5-continued

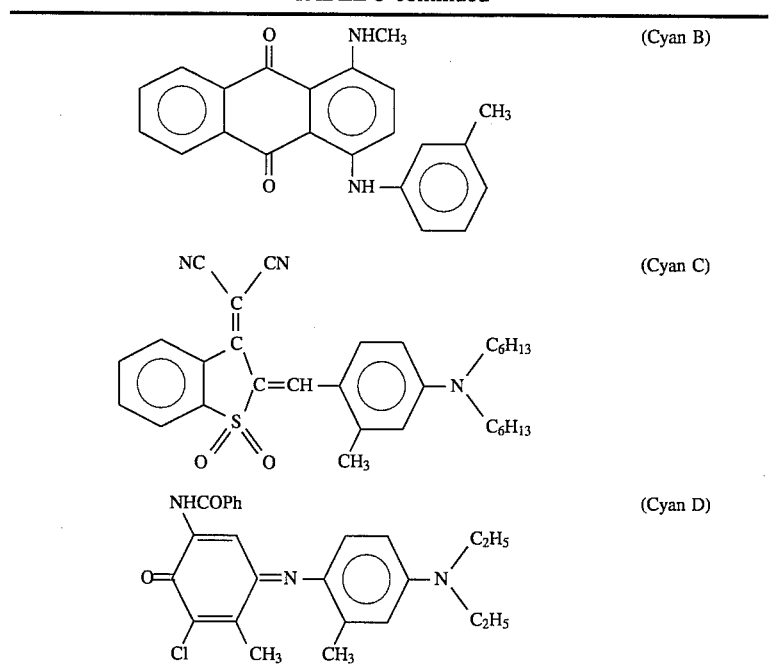

TABLE 6

|  |  | Color density O. D. max | Light fastness |
|---|---|---|---|
| Ex.23 | Yellow | 2.54 | ○ |
|  | Magenta | 2.76 | ⊚ |
|  | Cyan | 2.31 | ○ |
| Comp.Ex.8 | Yellow | 2.50 | Δ |
|  | Magenta | 2.14 | Δ |
|  | Cyan | 1.93 | Δ |

EXAMPLE 24

A thermal transfer sheet of the present invention was prepared in the same manner as in Example 1, except that ink compositions for the formation of dye layers of three color were prepared and then separately coated each in a width of 30 cm on the surface of the substrate film, which had been treated for rendering the surface thereof heat-resistant, to form dye layers of three colors, i.e., yellow, magenta, and cyan. Further, in this example, the following image-receiving sheet A was used.

| Yellow ink composition | |
|---|---|
| Yellow dye A specified in TABLE 5 | 3.36 parts |
| Yellow dye B specified in TABLE 5 | 2.24 parts |
| Polyvinyl acetoacetal resin | 3.5 parts |
| Methyl ethyl ketone | 49.45 parts |
| Toluene | 45.45 parts |
| Magenta ink composition | |
| Magenta dye A specified in TABLE 5 | 2.08 parts |
| Magenta dye B specified in TABLE 5 | 2.72 parts |
| Magenta dye C specified in TABLE 5 | 1.84 parts |

-continued

| Polyvinyl acetoacetal resin | 3.5 parts |
|---|---|
| Methyl ethyl ketone | 44.93 parts |
| Toluene | 44.94 parts |
| Cyan ink composition | |
| Cyan dye A specified in TABLE 5 | 2.46 parts |
| Cyan dye B specified in TABLE 5 | 2.46 parts |
| Cyan dye C specified in TABLE 5 | 1.23 parts |
| Polyvinyl acetoacetal resin | 3.5 parts |
| Methyl ethyl ketone | 45.17 parts |
| Toluene | 45.18 parts |

Image-Receiving Sheet A

150 μm-thick synthetic paper (Yupo-FPG#150; manufactured by Oji-Yuka Synthetic Paper Co., Ltd.) was used as a substrate sheet, and a coating solution having the following composition was coated by means of a wire bar on one surface of the synthetic paper so that the coverage on a dry basis was 4.0 g/m². The resultant coating was dried at 110° C. for 30 sec and then allowed to stand for 12 hr or more to form a thermal transfer image-receiving sheet of the present invention.

| Coating solution for receptive layer | |
|---|---|
| Polyester resin (Vylon 200; manufactured by Toyobo Co., Ltd.) | 100 parts |
| Hydroxyl-modified silicone | 3 part |
| Isocyanate compound (Takenate A-14; manufactured by Takeda Chemical Industries, Ltd.) | 3 parts |
| Tin catalyst (di-n-butyltin dilaurate manufactured by Tokyo Chemical Industry Co., Ltd.) | 0.1 parts |
| Addition polymerization | 3 parts |

| | Coating solution for receptive layer | |
|---|---|---|
| | silicone | |
| | Platinum catalyst<br>(CAT-PL-50T; manufactured by<br>The Shin-Etu Chemical Co., Ltd.) | 1.8 parts |
| | Reaction inhibitor<br>(CAT-PLR-5; manufactured by<br>The Shin-Etu Chemical Co., Ltd.) | 1.5 parts |
| | Methyl ethyl ketone/toluene<br>(weight ratio = 1/1) | 400 parts |

Each of the above thermal transfer sheets of the present invention and the above image-receiving sheet were put on top of the other in such a manner that the dye layer and the dye-receptive surface faced each other. Recording was carried out by means of a thermal head from the back surface of the thermal transfer sheet under conditions of a head applied voltage of 15.1 V and a printing time of 8 msec. The results were as given in the following table. Evaluation methods were as described above.

| Ex. | Color density<br>(O. D. max) | Light fastness |
|---|---|---|
| 24 | Y2.63 M2.60 C2.65 | Y: o  M: ⊙  C: o | o: good
⊙: very good

According to the present invention, the dye represented by the formula A or formula 1, as compared with other dyes, can form an image having higher density and sharpness and, further, superior various types of fastness, particularly light fastness. The use of the dye represented by the formula A or formula 1 in combination with other particular dyes can provide a full-color image having high density and sharpness and, further, excellent various types of fastness, particularly light fastness.

I claim:

1. A thermal transfer sheet comprising a substrate sheet and a dye layer provided on one surface of said substrate sheet, said dye layer comprising a binder and a dye represented by the following formula A:

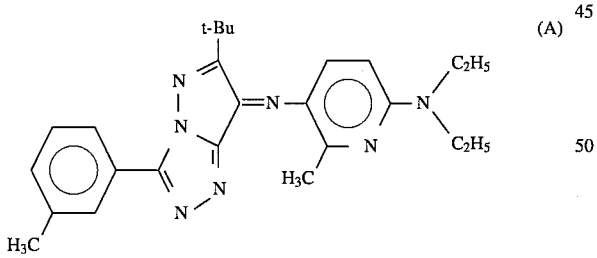

(A)

2. A thermal transfer sheet comprising a substrate sheet and a dye layer provided on one surface of said substrate sheet, said dye layer comprising a binder and a dye represented by the following formula 1 and at least one dye selected from those represented by the following formulae 2 to 16:

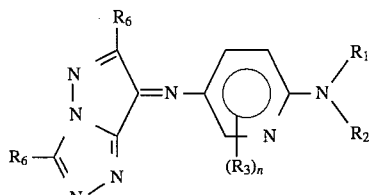

(1)

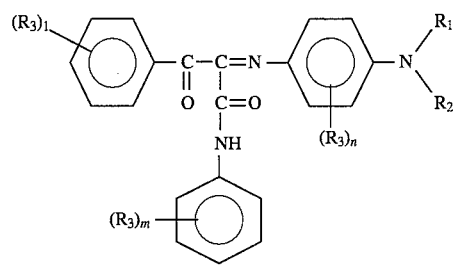

(2)

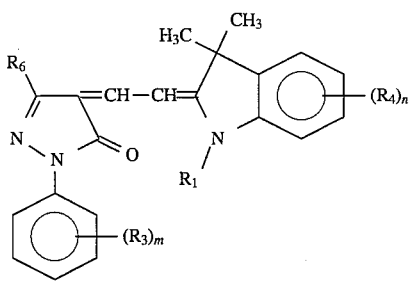

(3)

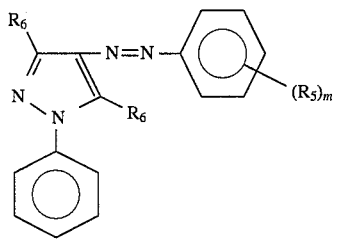

(4)

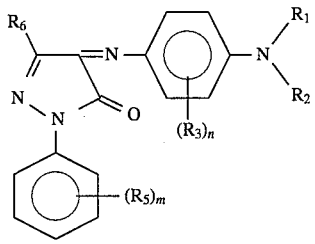

(5)

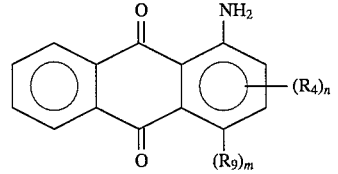

(6)

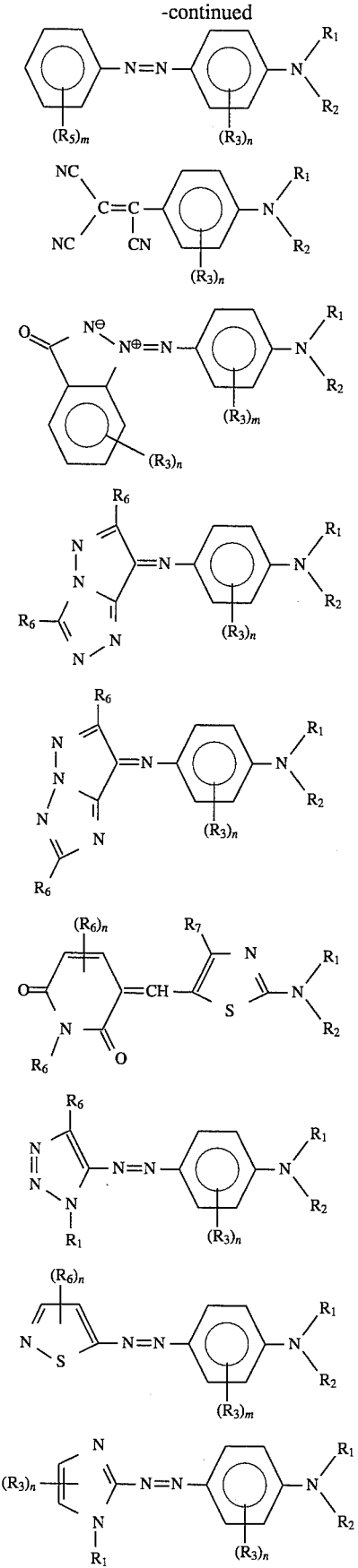

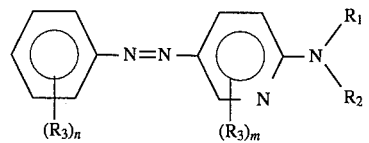

wherein $R_1$ and $R_2$ represent a substituted or unsubstituted alkyl group, a cycloalkyl group, or an aralkyl group, $R_3$ represents an alkyl group, an alkoxy group, an alkylcarbonylamino group, an alkylsulfonylamino group, an alkylaminocarbonyl group, an alkylaminosulfonyl group, a hydrogen atom, or a halogen atom, $R_4$ represents an alkoxycarbonyl group, an alkylaminocarbonyl group, an alkoxy group, an aryloxy group, an alkyl group, a cycloalkyl group, a heterocyclic group, a hydrogen atom, or a halogen atom, $R_5$ represents an alkyl group, an alkoxycarbonyl group, an alkylaminocarbonyl group, an alkoxy group, an alkylaminosulfonyl group, a cycloalkyl group, a cyano group, a nitro group, a halogen atom, or a hydrogen atom, $R_6$ represents a substituted or unsubstituted alkyl group, a substituted or unsubstituted aryl group, a substituted or unsubstituted amino group, a cycloalkyl group, a cyano group, a nitro group, or a halogen atom, $R_7$ represents an aryl group, an aromatic heterocyclic group, a cyano group, a nitro group, a halogen atom, or other electron-withdrawing groups, $R_8$ represents an alkyl group, a cycloalkyl group, or an $NR_{10}R_{11}$ group wherein $R_{10}$ and $R_{11}$ represent an alkylcarbonyl group or an arylcarbonyl group, $R_9$ represents an amino group or a hydroxyl group, and l, m, and n are an integer of 1 to 4.

3. A thermal transfer sheet comprising a substrate sheet and, successively provided on the same plane of said substrate sheet, dye layers of at least three colors of yellow, magenta, and cyan, said dye layer of yellow comprising a binder and a dye represented by the following formula 17, said dye layer of magenta comprising a binder and a dye represented by the formula (A) according to claim 1, said dye layer of cyan comprising a binder and a dye represented by the following formula 18:

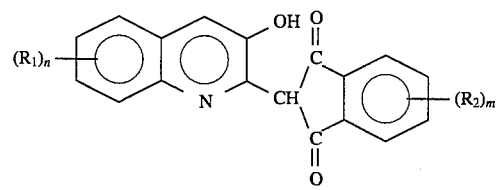

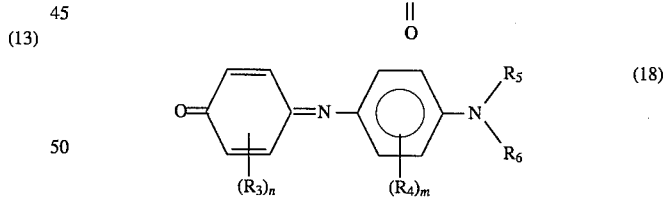

wherein $R_1$ represents an alkyl or alkoxy group, $R_2$ represents an alkoxycarbonyl group, an alkylaminocarbonyl group, an alkoxyalkyl group, an alkyl group, or a cycloalkyl group, $R_3$ represents an alkyl group, a hydrogen or halogen atom, CONHR, NHCOR, NHSO$_2$R, or SO$_2$NHR wherein R represents an alkyl group, a cycloalkyl group, an aryl group, or an aromatic heterocyclic group, $R_4$ represents an alkyl group, an alkoxy group, an alkylcarbonylamino group, an alkylsulfonylamino group, a carbamoyl group, a sulfamoyl group, a hydrogen atom, or a halogen atom, $R_5$ and $R_6$ represent an alkyl group or an aryl group, and m and n are an integer of 1 to 4.

* * * * *